Dec. 15, 1959     E. R. BOYCE     2,916,835

DITCHER

Filed May 8, 1957

INVENTOR.
Edward. R. Boyce
BY WHITEHEAD, VOGL & LOWE
PER Frank C. Lowe
ATTORNEYS

United States Patent Office 2,916,835
Patented Dec. 15, 1959

2,916,835

DITCHER

Edward R. Boyce, Johnstown, Colo.

Application May 8, 1957, Serial No. 657,876

3 Claims. (Cl. 37—98)

This invention relates to earth working apparatus and more particularly to plowing devices of the type which are adapted to be pulled through the earth to turn a double furrow and thereby form a trench or ditch and are commonly called ditchers, the primary object of the invention being to provide a novel and improved ditcher.

Other objects of the invention are to provide in a novel and improved ditcher a construction which: (a) is especially adapted to be mounted upon and carried by the conventional lift bars of a tractor to effect depth regulation of the ditcher by adjustment of the lift bars; (b) includes adjustable tilting means operable independently of vertical lifting movements whereby to vary the plowing angle of the ditcher; (c) provides a controlled variation of the moldboard angles and tilt to effect efficient operation of the ditcher through different types of soil and soil conditions which may be encountered; (d) incorporates means for varying the tilt of the ditcher to correlate it with changing soil conditions without stopping the ditch cutting operation; (e) permits a ditch of uniform depth to be plowed through a field having variable soil conditions; and (f) is a simple, economical, rugged and durable unit.

With the foregoing and other objects in view, all of which more fully hereinafter appear, my invention comprises certain novel and improved constructions, combinations, and arrangements of parts and elements as hereinafter described and defined in the appended claims and illustrated in preferred embodiment in the accompanying drawing in which:

Figure 1:
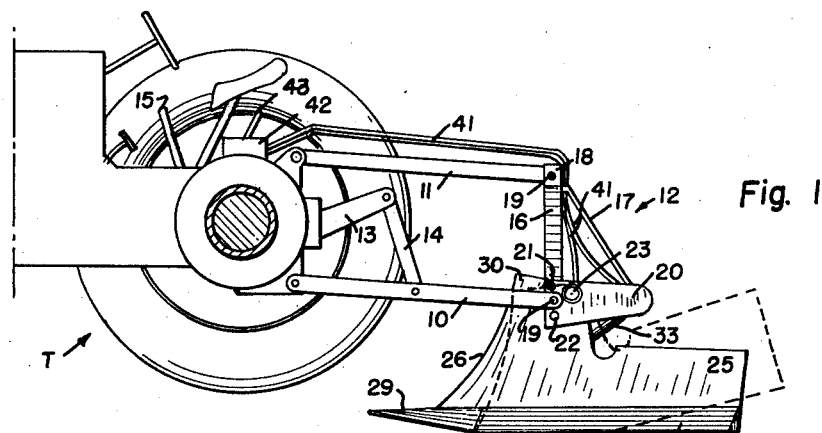
Figure 1 is a side elevation view of my improved ditcher as carried upon the lift bars of a tractor and with broken lines illustrating an alternative operative position of the ditcher.
Figure 2:
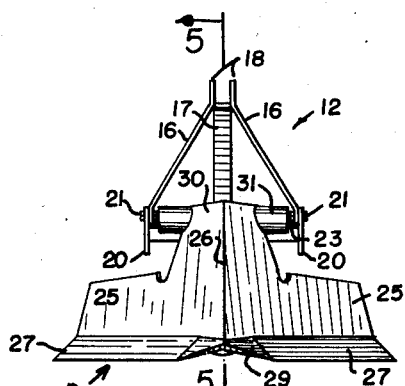
Figure 2 is a front elevation view of the ditcher per se as illustrated at Fig. 1.
Figure 3:
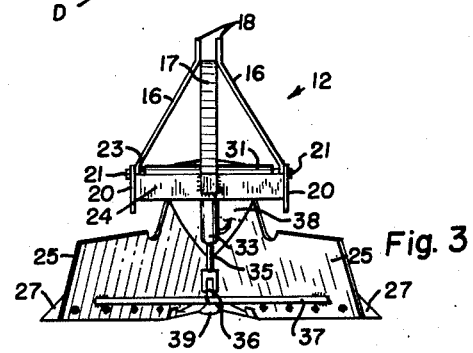
Figure 3 is a rear elevation view of the ditcher.
Figure 5:
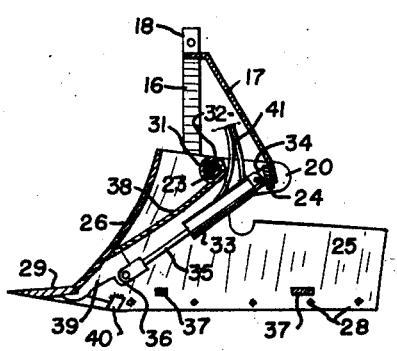
Figure 5 is a longitudinal sectional elevation as taken substantially from the indicated line 5—5 at Fig. 2.
Figure 4:
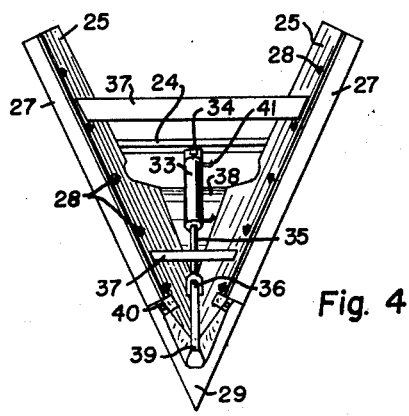
Figure 4 is a bottom view of the ditcher.

In the Western semi-arid States irrigation is necessary in agriculture. To effectively irrigate a tract of land, there is a constant need to cut various ditches and laterals to develop new fields and to change the ditching pattern of other fields whenever the type of crops is changed. To meet this need, various types of ditchers are used, and they are usually built as wedge shaped plowlike units. A ditcher may be a pair of simple sideboards joined together or it may be more elaborately constructed as a plowlike unit having a pair of moldboards which diverge rearwardly from a leading prow edge. This prow projects forwardly from its base as a slip point, and the elements function to throw and turn a furrow of earth from each side of the unit as it is pulled through the earth to form the ditch, much in the manner of an ordinary plow.

One of the difficulties of operating such a ditching unit lies in the variation of soil formation which is encountered as the ditcher is pulled through a field. For example, where the ditch course extends across a field of loosely compacted earth and then crosses a roadbed or a like reach of tightly compacted earth, the ditcher will move the earth aside in a different manner and will ordinarily dig into the ground to cut excessively deep or, conversely, pull out of the ground and cut a comparatively shallow ditch. This necessitates handwork or other special operations to finish the undercut and overcut portions of the ditch, and such special work is time consuming and expensive.

It was with this in view that the present invention was conceived and developed, and comprises in essence, an improved ditcher unit which is especially adapted to be mounted directly to the conventional lift bars of a tractor and which further includes means to rotate the ditcher about an axis transverse to its movement to provide both controlled vertical and tilt adjustments during the movement of the tratcor. Referring more particularly to the drawing, the ditcher D is adapted to be carired by the conventional lift bar assembly at the rear of a tractor T, to extend rearwardly of and in tandem with the tractor, all elements being substantially symmetrical about the vertical, longitudinal center-plane of the tractor. This lift bar assembly is a standardized unit and includes a pair of bottom arms 10 pivotally connected to the rear of the tractor to extend rearwardly therefrom, one at each side of the longitudinal center-plane of the tractor, and a central top arm 11 pivotally connected to the tractor to extend rearwardly thereof at the longitudinal center-plane above the bottom arms. The rearwardly-extending arms 10 and 11 lie in substantial spaced parallelism, and a vertical transversely-disposed A-frame 12, which carries the ditcher D, is pivotally connected to the extended ends of the arms. This connection effects substantial vertical movement of the A-frame as the arms 10 and 11 are rotated about their pivotal connections at the tractor. Actuation of this lift bar assembly is effected through power arms 13 which extend from the tractor above the bottom arms 10 and are connected to the bottom arms by links 14. A suitable operating lever 15 is located on the tractor to effect the power raising and lowering of this lift arm assembly.

The A-frame 12 includes a pair of inclined side bars 16 which form the triangular legs of the A-frame. The top of each bar is connected to a rearwardly-extending stabilizing bar 17 with a portion of the top extending above the stabilizing bar 17 to upstand as an ear 18. The end of the top arm 11 lies between and is pivotally connected to these ears as by a pin 19 extending through suitable orifices in the arm 11 and ears 18.

The spaced bottom ends of the inclined side bars 16 are turned downwardly, and each end is affixed to the forward end of a rearwardly-extending side plate 20 as by bolts 21 extending through suitable orifices in the bar and plate. The side plates 20 lie in mutual spaced parallelism at each side of the vertical, longitudinal center-plane of the unit to extend rearwardly from their connections with the side bars a sufficient distance to provide for a laterally stable and rigid hanger for supporing the ditcher. A pair of orifices 22 is located near the leading edge of each side plate 20 below the connection of the side bar 16 for attachment of each plate to the rear end of a bottom arm 10 as by a pin 19 extending through a suitable orifice in the end of the arm and one of the orifices 22. The side plates are held apart at their front end by a transverse rock shaft 23 which lies between the side plates 20 immediately behind the points of attachment of the side bars 16. They are held apart at their rear end by a transverse strut 24 which lies between the side plates at their rearward extremity. The stabilizing bar 17 extends downwardly and rearwardly from the apex connection of the side bars 16 and its lower rearward end is connected to the strut 24 at its center point to rigidify the unit.

The ditcher D is formed by a pair of diverging, inclined sidewall plates or moldboards 25 which diverge from the leading prow edge 26 at a selected angle to form the wedge-shaped unit. These moldboards may be dished slightly along their base edges to provide a typical plow-like construction, with the lower edges being splayed by triangular share bars 27 suitably affixed to the base edge of each moldboard, as by bolts 28. The forward edge of the share bars of the ditcher fairs into a slip point 29 which extends forwardly from the bottom of the prow 26.

The forward section of the moldboards extends upwardly to form a head 30 above the body of the ditcher and carries a transversely-disposed pipe or tube 31 through which the rock shaft 23 extends. The tube 31 includes suitable bearings 32 to facilitate rotation of the unit which is thereby pivotally connected to the rock shaft 23 for rotation about the transverse rock shaft axis to effect tilting of the ditcher.

The tilting of the ditcher about this transverse axis of the shaft is controlled by a double acting cylinder 33 having a clevis at its butt end which is pin-connected to a suitable ear 34 at the center of the strut 24. This cylinder has a clevis at the end of its plunger 35 which is pin-connected to an ear 36 inside the forward end of the ditcher moldboard plates near the bottom of the unit. Extension of this plunger 35 from its cylinder rotates the ditcher to tilt the slip point 29 upwardly while retraction of the plunger rotates the ditcher to direct the slip point downwardly, as indicated by broken lines at Fig. 1.

The ditcher D may be constructed in various ways substantially as above described. However, a preferred construction includes suitable transverse struts 37 between the moldboards 25 to rigidify and hold them apart, and also an inverted triangular reinforcing plate 38 between the moldboards near the front portion. The base of this plate 38 is at the top of the moldboards and is affixed to the tube 31 with the apex below between the moldboards at the prow. A heavy lug 39 forms the ear 36 and lies between the prow and reinforces the lower portion of the leading edge of the prow. The slip point 29 is formed as an overfolded, triangular, metallic member which lies against leading portions of the share bars with its point being supported by and resting upon the lug 39. This point is suitably held in position as by clips 40 for easy removal and replacement.

Operation of this unit is relatively simple. Once mounted upon the tractor lift bars, the double acting piston is connected with hydraulic control lines 41 extending to the tractor and to a control box 42 and lever 43 near the tractor operator's seat, all in a conventional arrangement. Extension or retraction of the plunger 33 effects a selected tilt of the ditcher, and as a ditch cutting operation commences, the ditcher is tilted forward at a steep angle so that movement of the tractor directs the slip point downwardly into the earth. When the ditcher reaches a selected depth, further adjustment of the tilt is made to hold it substantially at a selected depth and to remain cutting and moving earth with a minimum of uplift or downpull force on the tractor since the weight of the tractor is seldom sufficient to hold the ditcher at any selected depth against the uplift or downpull pressure of earth against the ditcher when it is not properly aligned to be pulled through a given type of soil. As a ditch cutting operation proceeds, the operator can quickly learn by the feel and by the pull of the unit, as well as by noting the type of soil which he is moving through, just the tilt necessary to hold the ditcher at its selected depth without excessive force.

While I have described my invention in considerable detail, it is obvious that modifications and alterations which are within the scope and spirit of my invention may be made by those skilled in the art, and hence, I desire that my protection be limited, not by the details and illustrations herein described, but only by the proper scope of the appended claims.

I claim:

1. In combination with the accessory-attachment lift bars of a tractor behind the tractor which are adapted for vertically lifting an implement affixed thereto in tandem in a longitudinal array with the tractor, a ditcher including a transversely-disposed A-frame support having the top and base points pivotally attached to the lift bars to remain in a substantially vertical position at various lift bar adjustments, a side plate extending rearwardly from each base point in a substantially horizontal position, a transverse rock shaft carried by the side plates adjacent to the A-frame base pivot points, a ditcher body suspended from the rock shaft to pivotally depend therefrom, a transverse abutment strut at the rear end of the side plates, and actuator means between the strut and body at a point substantially below the rock shaft and being adapted to forcibly tilt the body about said rock shaft.

2. A ditcher formed as a wedge-shaped body having a leading prow edge, and including moldboard plates diverging from the edge forming the sides of the ditcher, an upwardly extending portion of the plates at the front of the unit forming a head, a transversely-disposed tube on the head, and a carriage including rearwardly extending side plates, a transverse rock shaft extending through the tube adapted to support the body, and a transverse abutment strut at the rear of the side plates, means for supporting and lifting the carriage without rotating it, and a plunger means on the abutment strut and extending to the body substantially below the rock shaft and adjacent to the prow edge and being adapted to rotate the body to a selected angle of tilt with respect to the carriage.

3. A ditcher adapted to be supported by the lift arms of a tractor and including in combination therewith, a carriage including a horizontally disposed side member connected to the lift bars and being adapted to be shifted vertically and without rotation by the lift bars, a transverse rock shaft on the front end of the side member, a transverse abutment means on the rear end of the side member, a wedge-shaped ditcher body including a pair of mold-board side plates diverging from a leading prow edge with portions of the ditcher body extending upwardly and being pivotally connected to the rock shaft and an extensible and retractable actuator interconnecting the abutment means and the ditcher body with the connection to the ditcher body being at a point spaced substantially below the rock shaft and being adapted to forcibly tilt the body about the rock shaft.

References Cited in the file of this patent

UNITED STATES PATENTS

| | | |
|---|---|---|
| 2,169,716 | Werner et al. | Aug. 15, 1939 |
| 2,704,495 | Schwindt et al. | Mar. 22, 1955 |
| 2,755,571 | Clark | July 24, 1956 |
| 2,858,756 | Magarian | Nov. 4, 1958 |
| 2,864,181 | Simmons | Dec. 16, 1958 |

FOREIGN PATENTS

| | | |
|---|---|---|
| 428,500 | Italy | Dec. 19, 1947 |